United States Patent
Kaneuchi et al.

(10) Patent No.: US 8,007,551 B2
(45) Date of Patent: Aug. 30, 2011

(54) SUPER FINISHING STONE AND SUPER FINISHING METHOD

(75) Inventors: Eiji Kaneuchi, Nara (JP); Takeshi Takahashi, Kashiba (JP); Yoshihiro Oono, Katsuragi (JP); Takeshi Kimura, Kawanishi (JP)

(73) Assignee: Jtekt Corporation, Osaka-Shi, Osaka (JP)

( * ) Notice: Subject to any disclaimer, the term of this patent is extended or adjusted under 35 U.S.C. 154(b) by 1009 days.

(21) Appl. No.: 11/898,580

(22) Filed: Sep. 13, 2007

(65) Prior Publication Data

US 2008/0066386 A1   Mar. 20, 2008

(30) Foreign Application Priority Data

Sep. 14, 2006   (JP) ................. P2006-249095

(51) Int. Cl.
*B24D 3/00* (2006.01)
(52) U.S. Cl. ......................................... 51/293
(58) Field of Classification Search ............ 51/293
See application file for complete search history.

(56) References Cited

U.S. PATENT DOCUMENTS

| 6,402,600 B1 | 6/2002 | Besch |
| 2003/0060152 A1 | 3/2003 | Lee |

FOREIGN PATENT DOCUMENTS

| JP | 11277447 A | * 10/1999 |
| JP | 2002-192450 | 7/2002 |
| JP | 2002192450 A | * 7/2002 |
| JP | 2002-295618 | 10/2002 |

OTHER PUBLICATIONS

European Search Report dated Dec. 4, 2007.

* cited by examiner

*Primary Examiner* — Melvin C Mayes
*Assistant Examiner* — Melissa Stalder
(74) *Attorney, Agent, or Firm* — McGinn IP Law Group, PLLC

(57) ABSTRACT

The super finishing stone has such a shape that a width of an abrasive surface in a direction perpendicular to a radial direction becomes gradually narrower from outside to inside in the radial direction, when the raceway surface and the abrasive surface in contact with the raceway surface are seen at a plurality of sections perpendicular to the radial direction of the object to be worked, so that the abrasive surface and the raceway surface in contact with the raceway surface may intersect with each other at a constant angle at opposite side edges of the abrasive surface.

3 Claims, 8 Drawing Sheets

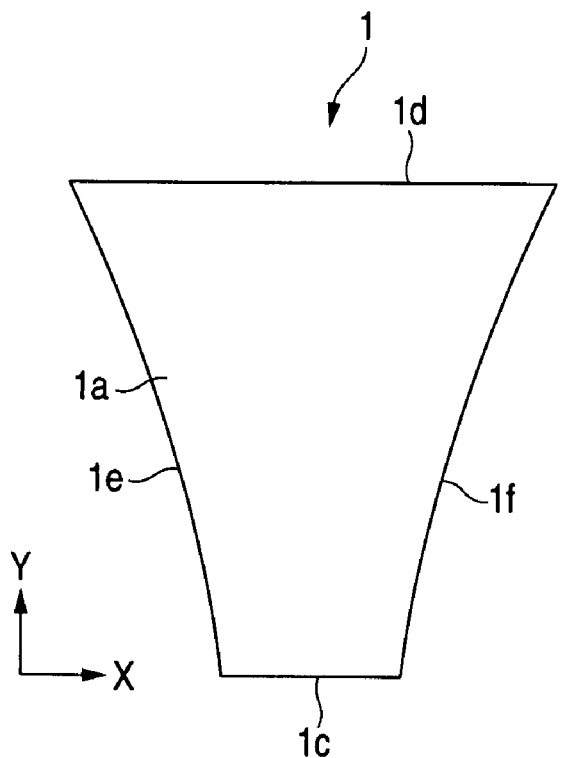
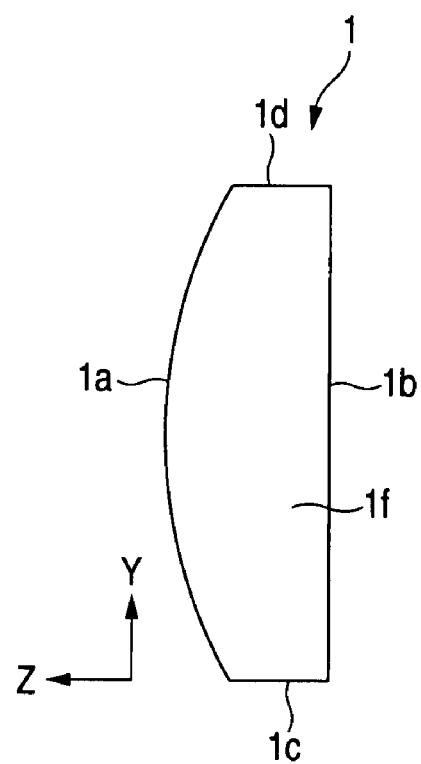
FIG. 1A
FIG. 1B

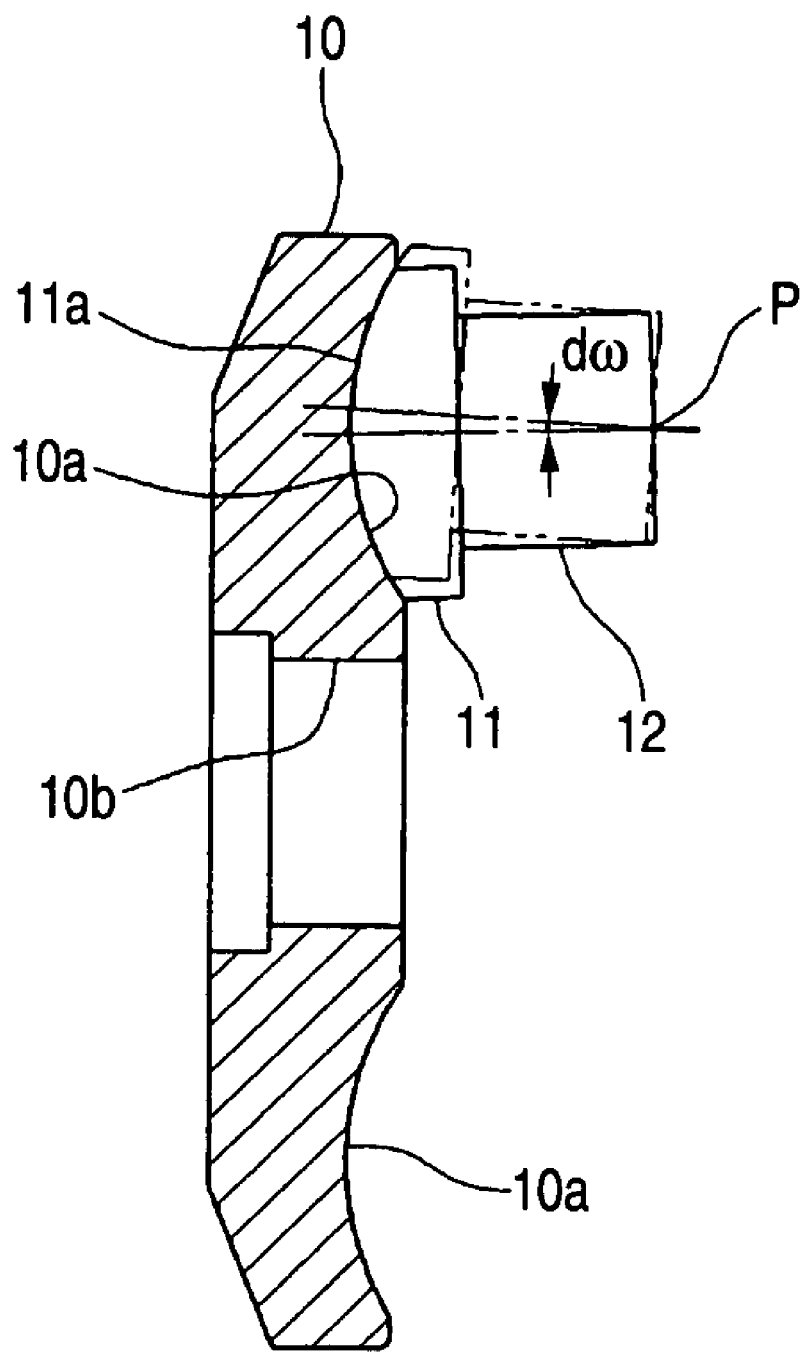

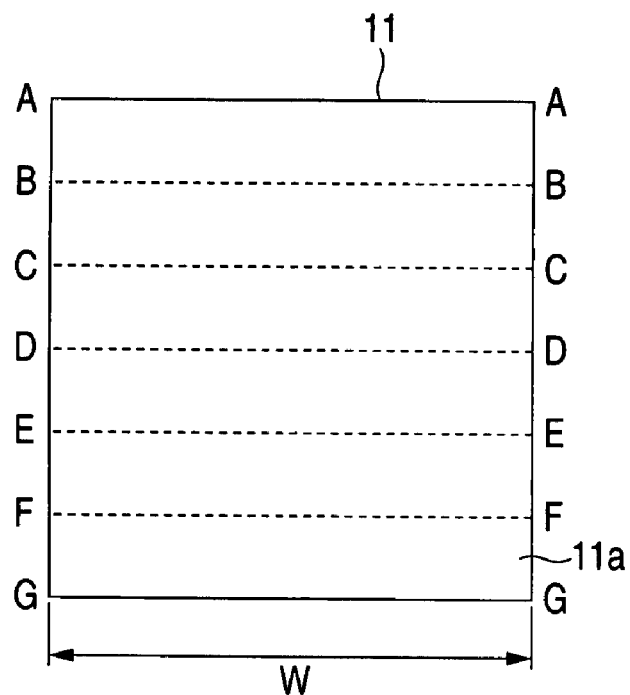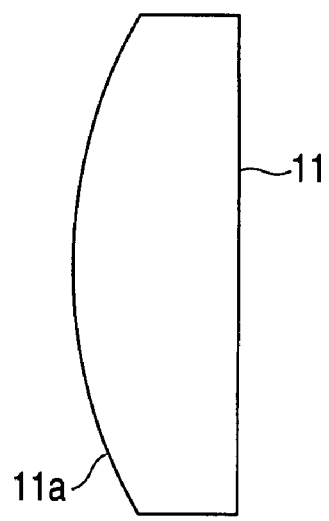

SUPER FINISHING STONE AND SUPER FINISHING METHOD

BACKGROUND OF THE INVENTION

The present invention relates to a super finishing stone which performs super finishing work on a raceway surface of an object to be worked such as a power transmission disk of a toroidal continuously variable transmission and rings of a thrust ball bearing, which has a raceway surface for receiving a thrust load, and a super finishing method.

In the disk of the toroidal continuously variable transmission, for example, the raceway surface having an arc-shape in cross section is continuously formed in a circumferential direction (Reference should be made to Japanese Patent Publication No. JP-A-2002-295618, for example). FIG. 5A is a sectional view showing a disk 10 of this type and FIG. 5B is a front view thereof. In the drawings, the disk 10 is formed with a fitting hole 10b to be fitted to a shaft (not shown) at a center thereof, and a raceway surface 10a on one surface thereof. The raceway surface 10a which has been formed in a predetermined shape in advance, as shown in the drawings, is further super finished by a super finishing stone, by rotating the disk 10 around its axis.

FIG. 6 is a sectional view of the disk 10 in a state where a super finishing stone (grindstone) 11 is abutted against the raceway surface 10a. The super finishing stone 11 is supported by a support part 12, and oscillates around a center P of curvature of the raceway surface 10a within a predetermined angle range. With this super finishing stone, the super finishing work is performed on the raceway surface 10a.

In FIGS. 5A and 5B, seven sections from section A-A to section G-G in the drawing as desired sections which intersect a radial direction of the disk 10 are imagined, for example. The raceway surface 10a which is a three-dimensional curved surface has a flat shape at an intermediate section D-D, and comes into a convex shape which is gradually swelled toward a center of the section in order from the section E-E, the section F-F, to the section G-G inwardly in the radial direction. On the other hand, the raceway surface 10a comes into a concave shape which is gradually recessed toward a center of the section in order from the section C-C, the section B-B, to the section A-A.

FIGS. 7A and 7B are respectively a front view and a side view of the super finishing stone 11 which has been conventionally used. The super finishing stone 11 has a constant width W, and a so-called hog-backed shape as seen in a side view. Seven sections from section A-A to section G-G corresponding to the sections of the raceway surface 10a are imagined on an abrasive (grinding) surface 11a after the work (disk) has been oriented. The abrasive surface 11a has a flat shape at an intermediate section D-D, and comes into a concave shape which is gradually recessed toward a center of the section in order from the section E-E, the section F-F, to the section G-G inwardly in the radial direction. On the other hand, the abrasive surface 11a comes into a convex shape which is gradually swelled toward a center of the section in order from the section C-C, the section B-B, to the section A-A. In short, surface profiles of the raceway surface 10a and the abrasive surface 11a match with each other in a convex-concave relation.

The aforesaid super finishing stone 11 can oscillate as described above. In case where the super finishing stone 11 has oscillated outward in the radial direction by an angle d ω from a position where the surface profiles of the raceway surface 10a and the abrasive surface 11a match with each other (for example, a center of an angle of oscillation), as shown in FIG. 6, the abrasive surface to be abutted against the raceway surface 10a is displaced. For example, in the above described case, the section E-E of the abrasive surface is abutted against the section D-D of the raceway surface. FIG. 8 is a view showing a state of contact between the raceway surface 10a and the abrasive surface 1a in case where they are displaced from each other. In FIG. 8, solid lines represent the profile of the abrasive surface 11a, and dotted lines represent the profile of the raceway surface 10a. Curvature becomes larger in order from a convex 1, a convex 2, to a convex 3, and in order from a concave 1, a concave 2, to a concave 3.

In this case, an entirety of the abrasive surface 11a as seen at one section will not come into contact with the raceway surface 10a, but only right and left edges of the abrasive surface 11a in a sectional shape come into contact with the raceway surface 10a. In fact, however, regions close to the edges also come into contact, as the curvature becomes smaller. However, as shown in FIG. 8, the contacted regions are concentrated to opposite side ends as going inward in the radial direction, which leads to high edge load condition. As the results, there is a problem that working conditions become inconstant depending on positions, and unevenness in super finishing may occur.

SUMMARY OF THE INVENTION

In view of such problems in the related art, it is an object of the invention to provide a super finishing stone with which occurrence of unevenness in finishing can be restrained, even though the super finishing stone oscillates, and a super finishing stone.

According to the invention, there is provided a super finishing stone for performing a super finishing work on a raceway surface, for receiving a thrust load, of an object to be worked, the super finishing stone comprising:

an abrasive surface having a shape in which a width of the abrasive surface becomes gradually narrower from outside to inside in a radial direction of the object, so that, when the raceway surface and the abrasive surface in contact with the raceway surface are seen at a plurality of sections perpendicular to the radial direction of the object, intersection angles between the abrasive surface and the raceway surface in contact with the abrasive surface at opposite side edges of the abrasive surface are made constant.

In the super finishing stone having the above described structure, although the opposite side edges of the abrasive surface as seen at the respective sections are abutted against the raceway surface along with the oscillation outward in the radial direction, the intersection angles between the abrasive surface and the raceway surface are made constant at the respective sections. Accordingly, the state of contact is made constant and hence, the edge load can be made constant.

According to the invention, there is provided a super finishing method of super finishing a raceway surface of an object to be worked, in which the raceway surface has a flat shape at an intermediate section thereof in the radial direction when seeing at a plurality of sections perpendicular to a radial direction of the object, comes into a convex shape which is gradually swelled toward a center of the section as approaching inwardly in the radial direction, and comes into a concave shape which is gradually recessed toward a center of the section as approaching outwardly in the radially direction, the method comprising the steps of:

disposing a super finishing stone according to claim 3 so that surface profiles of the raceway surface and the abrasive surface match with each other in a convex-concave relation, and oscillating the super finishing stone in the radial direction within a predetermined angle range around a center of curvature of the raceway surface.

According to the super finishing stone of the invention, unevenness in finishing can be restrained, even in case where the opposite side edges of the abrasive surface are abutted against the raceway surface along with the oscillation.

BRIEF DESCRIPTION OF THE DRAWINGS

FIG. 1A is a front view showing a super finishing stone in an embodiment according to the invention and FIG. 1B is a side view thereof.

FIG. 6 is a sectional view of the disk in a state where a conventional super finishing stone is abutted against a raceway surface of the disk.

FIG. 7A is a front view showing the super finishing stone which has been conventionally used, and FIG. 7B is a side view thereof.

DETAILED DESCRIPTION OF PREFERRED EMBODIMENTS

Figure 5A:
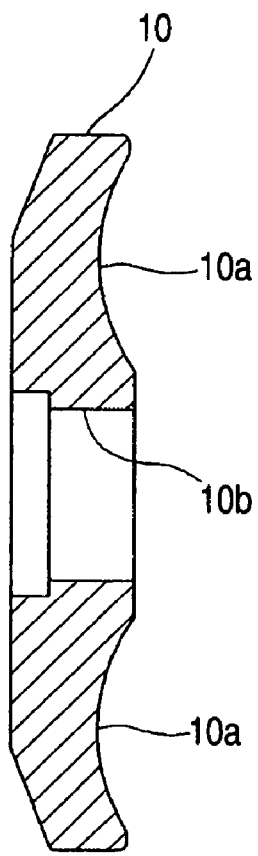
FIG. 5A is a sectional view showing a power transmission disk of a toroidal continuously variable transmission.
Figure 5B:
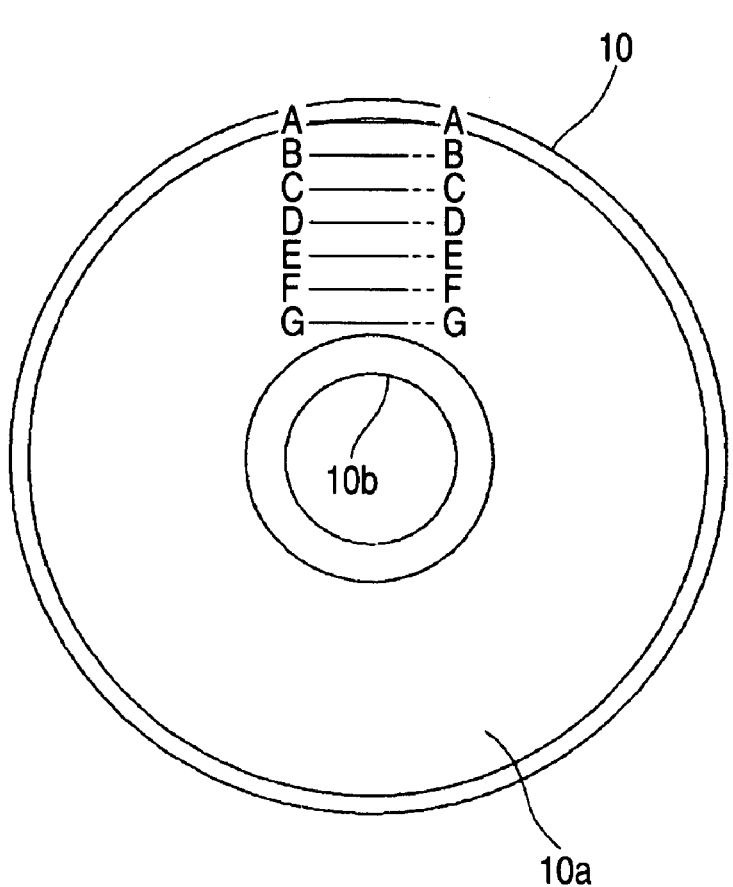
FIG. 5B is a front view thereof.
Figure 8:
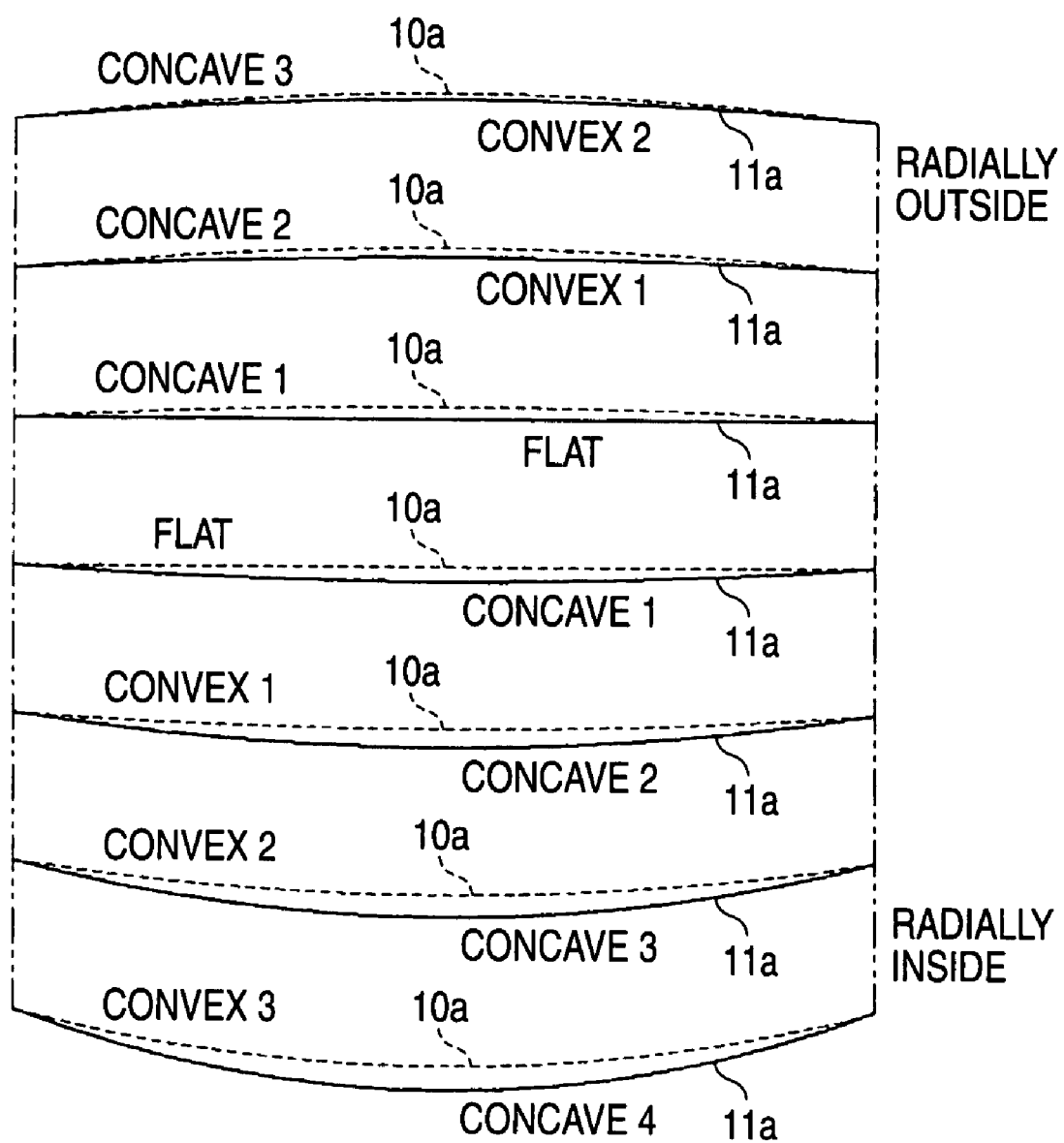
FIG. 8 is a view of the conventional super finishing stone showing a state of contact between the raceway surface and the abrasive surface, in case where they are displaced from each other.

Now, a super finishing stone in an embodiment according to the invention will be described, referring to the drawings. An object to be worked is the power transmission disk 10 of full toroidal continuously variable transmission which is one kind of the aforesaid toroidal continuously variable transmission, as shown in FIG. 5.

Figure 2:
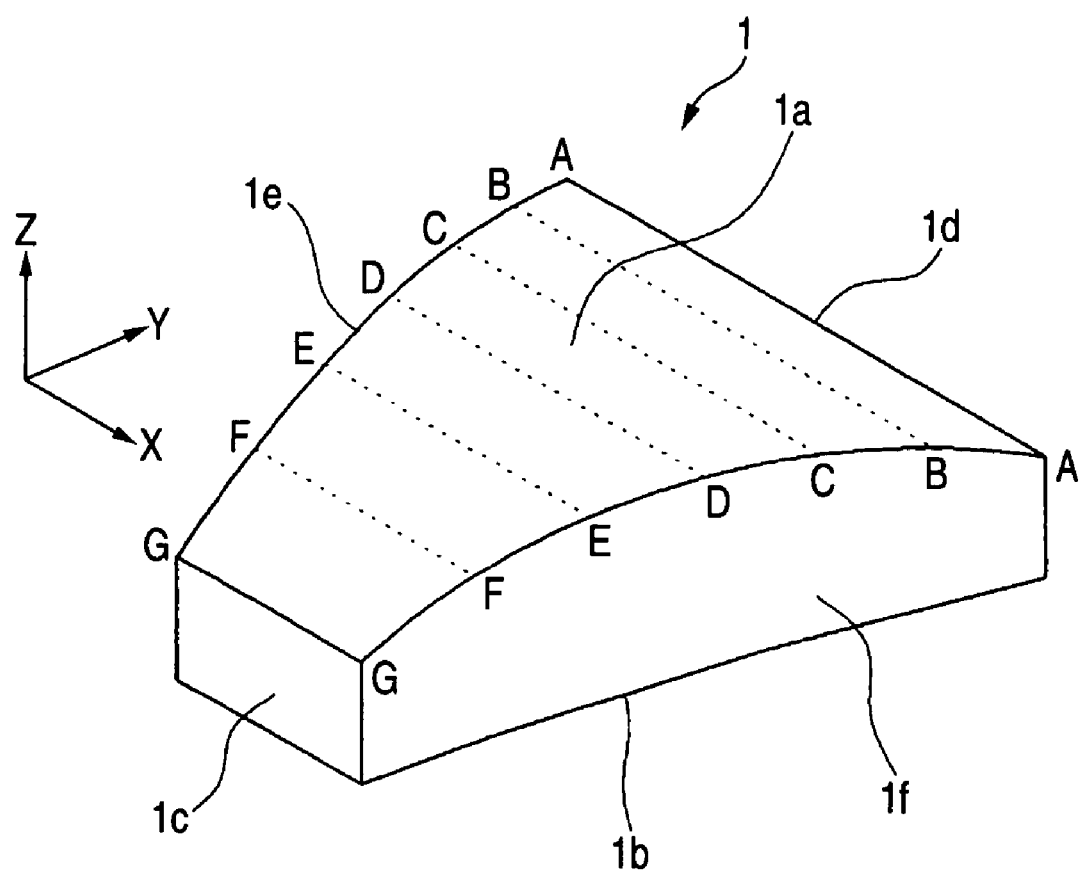
FIG. 2 is a perspective view of the super finishing stone as shown in FIG. 1.

FIG. 1A is a front view showing a super finishing stone (grindstone) 1, and FIG. 1B is a side view thereof. FIG. 2 is a perspective view of the super finishing stone 1. In the drawings, a radial direction of an abrasive (grinding) surface 1a which corresponds to the radial direction of the disk 10 is determined as a direction Y, and directions X, Y, Z which are perpendicular to one another are determined as shown in the drawings. A back surface 1b of the grinder 1 at an opposite side to the abrasive surface 1a, an inward end surface 1c, and an outward end surface 1d in the radial direction are flat or substantially flat.

On the other hand, the abrasive surface 1a as seen in a side view has an arc-shape which is convex in the direction Z, and has a largest thickness at a center in the direction Y. A width of the abrasive surface 1a in the direction X gradually becomes smaller in a direction perpendicular to the radial direction from upside to downside in the direction Y, that is, from outside to inside in the radial direction (in other words, the width of the abrasive surface 1a becomes larger in the direction perpendicular to the radial direction, from the inside to the outside in the radial direction). Moreover, the opposite side surfaces 1e, 1f are nearly flat surfaces having a moderate curve, and composed of a plurality of curved surfaces which are slightly different from one another in a radius of curvature, for example.

In FIG. 2, seven sections from section A-A to section G-G (sections in parallel with an X-Z plane) corresponding to the sections of the raceway surface 10a (FIGS. 5A and 5B) are imagined on an abrasive surface 1a. The abrasive surface 1a has a flat shape at an intermediate section D-D, and comes into a concave shape which is gradually recessed toward a center of the section in order from the section E-E, the section F-F, to the section G-G inwardly in the radial direction. On the other hand, the abrasive surface 1a comes into a convex shape which is gradually swelled toward a center of the section in order from the section C-C, the section B-B, to the section A-A. In this manner, surface profiles of the raceway surface 10a and the abrasive surface 1a match with each other in a convex-concave relation.

Figure 4:
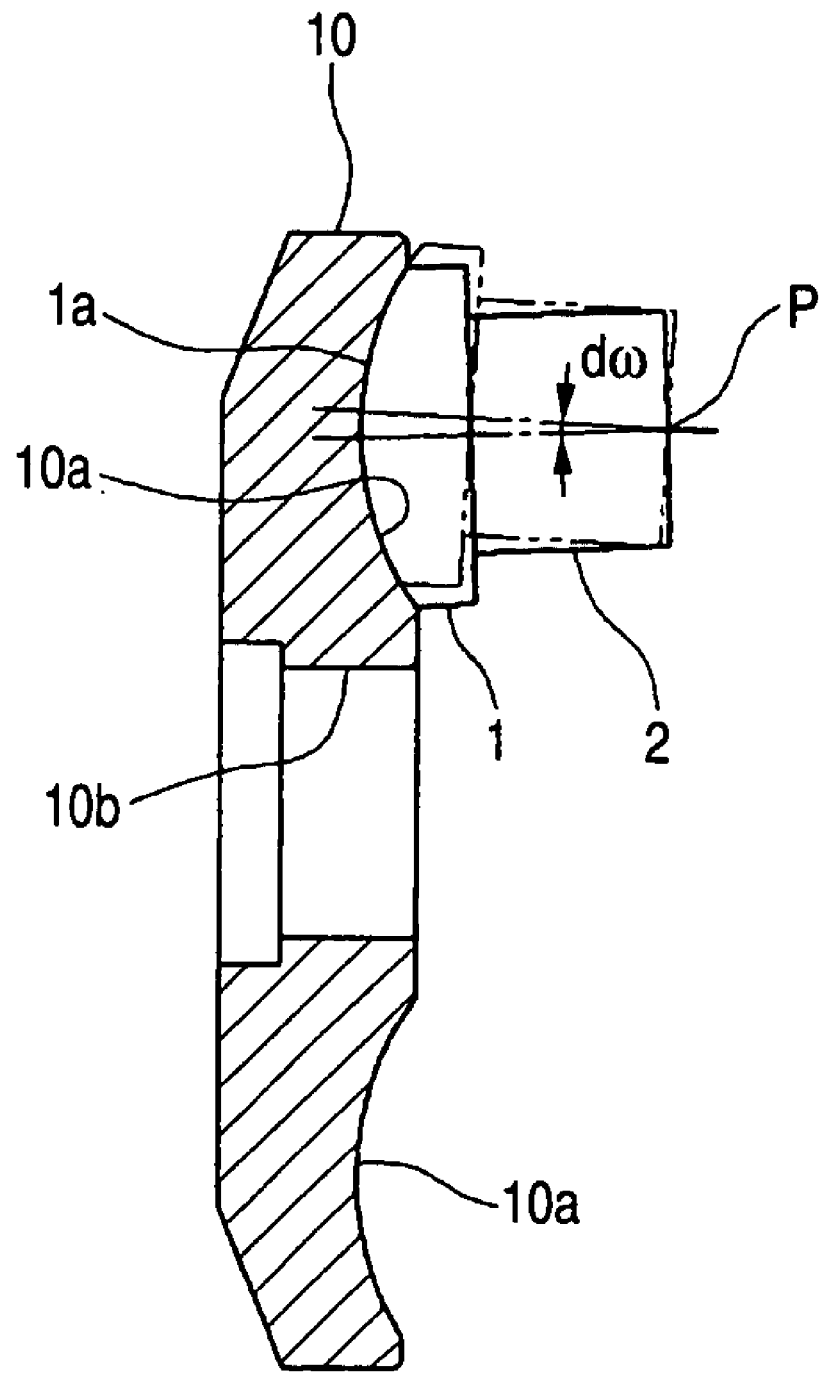
FIG. 4 is a sectional view of a disk in a state where the super finishing stone is abutted against the raceway surface of the disk.

FIG. 4 is a sectional view of the disk 10 in a state where the super finishing stone 1 is abutted against the raceway surface 10a. The super finishing stone 1 is supported by the support part 2 and oscillates within a predetermined angle range around a center of curvature P of the raceway surface 10a. Super finishing work is performed on the raceway surface 10a by means of the super finishing stone 1 as shown in FIG. 4.

Figure 3:
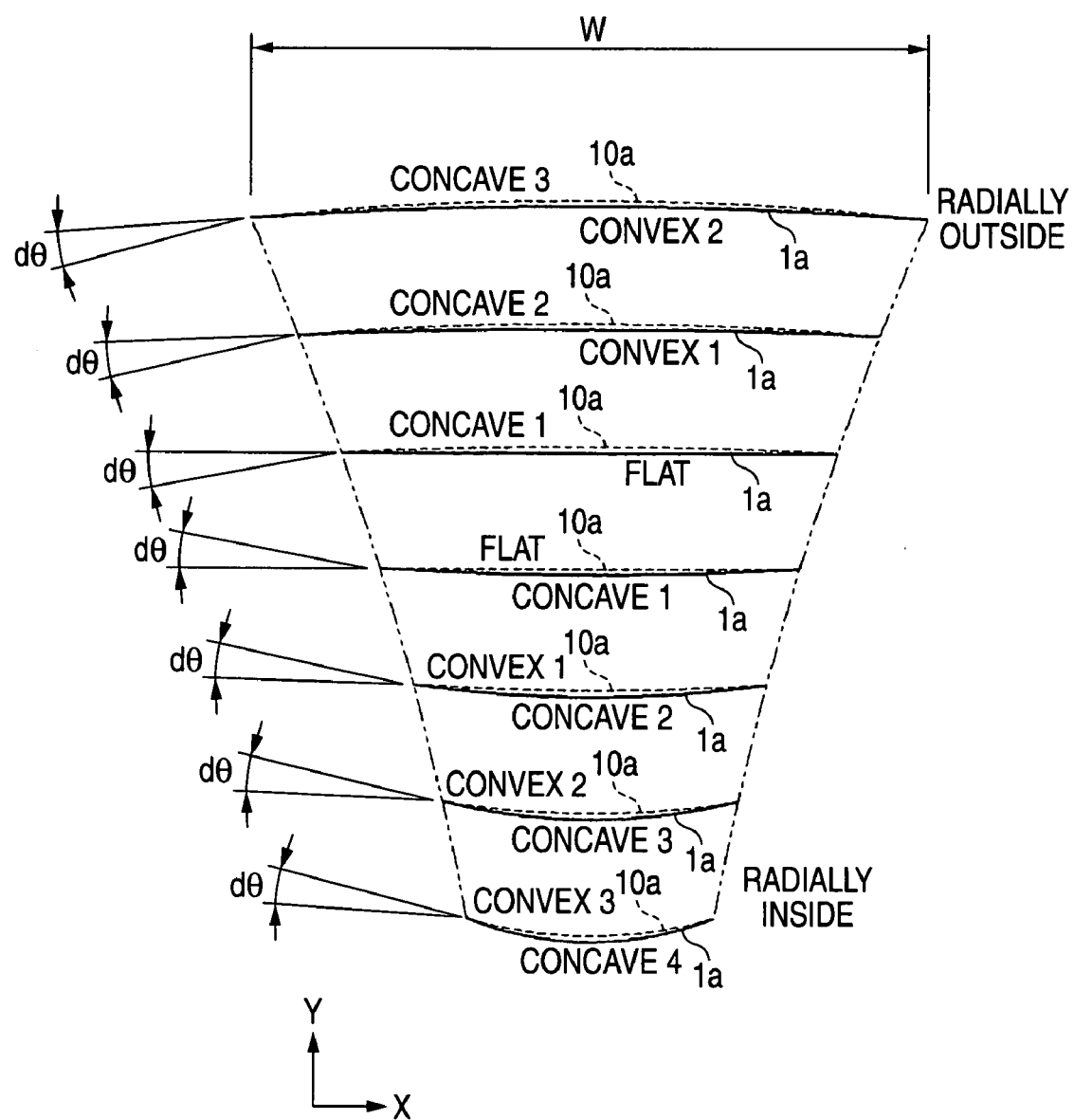
FIG. 3 is a view showing a state of contact between a raceway surface and an abrasive surface in case where they are displaced from each other, as seen at a plurality of positions of sections perpendicular to the radial direction.

In case where the super finishing stone 1 has oscillated by an angle dω outward in the radial direction from a position where the surface profiles (curved surfaces) of the raceway surface 10a and the abrasive surface 1a match with each other (a center of the angle of oscillation, for example), as shown in FIG. 4, the abrasive surface to be abutted against the raceway surface 10a is displaced. For example, in the above described embodiment, the section E-E of the abrasive surface may be abutted against the section D-D of the raceway surface. FIG. 3 is a view showing the raceway surface 10a and the abrasive surface 1a in case where they are displaced from each other. The raceway surface 1a and the abrasive surface 1a are shown in a state where they are in contact with each other at a plurality of (seven) positions of the sections (the sections in parallel with the X-Z plane) which are perpendicular to the radial direction (the direction Y). In FIG. 3, solid lines represent the profile of the abrasive surface 1a, and dotted lines represent the profile of the raceway surface 10a. The curvature becomes larger in order from convex 1, convex 2, to convex 3, and in order from concave 1, concave 2, to concave 3.

In FIG. 3, the abrasive surface 1a as seen at the respective sections is abutted against the raceway surface 10a at opposite side edges thereof. Moreover, the curvatures of the abrasive surface 1a and the raceway surface 10a vary depending on the sections in the radial direction at which they are seen. Now, the width W of the abrasive surface 1a is varied so that an intersection angle dθ between the abrasive surface 1a and the raceway surface 10a at the opposite side edges of the abrasive surface 1a may be the same at all the sections. In short, the width W of the abrasive surface 1a is gradually mage smaller, inwardly in the radial direction. In this manner, the state of contact between the abrasive surface 1a and the raceway surface 10a at the opposite side edges of the abrasive surface 1a or in their vicinity is made constant, and the edge loads can be made constant. Accordingly, working conditions at all the positions are made constant, and hence, occurrence of unevenness in finishing can be restrained.

It is ideal that the variation in the width of the abrasive surface 1a, as described above, continues so that the aforesaid intersection angle dθ may be constant at a desired section. However, in case where the grinder has such a profile that the width of the abrasive surface becomes narrower from the outside to the inside in the radial direction, and has a limited number of sections, it is possible to obtain a certain effect that occurrence of unevenness in finishing is restrained (or reduced) by varying the width so that a difference between the angles dθ may become smaller and the intersection angles dθ may be made constant at the respective sections.

In the above described embodiment, the object to be worked is the power transmission disk of the toroidal continuously variable transmission. However, the super finishing stone as described above can be used for super finishing raceway surfaces in various other objects to be worked (for example, a thrust ball bearing) each having the raceway surface for receiving a thrust load.

What is claimed is:

1. A super finishing stone for performing super finishing work on a raceway surface, the super finishing stone comprising:
   an abrasive surface comprising a shape in which a width of the abrasive surface becomes gradually narrower from outside to inside in a radial direction of the raceway surface, the abrasive surface being formed such that if the raceway surface and the abrasive surface are in contact, then intersection angles, at a plurality of sections along the radial direction and as viewed from a direction perpendicular to the radial direction, between the abrasive surface and the raceway surface in contact with the abrasive surface at opposite side edges of the abrasive surface are constant,
   wherein the raceway surface comprises a flat shape at an intermediate section thereof in the radial direction as viewed from the direction perpendicular to the radial direction,
   wherein the raceway surface comprises a convex shape which is gradually swelled toward a center of the section as the raceway surface approaches inwardly in the radial direction,
   wherein the raceway surface comprises a concave shape which is gradually recessed toward a center of the section as the raceway surface approaches outwardly in the radial direction,
   wherein the abrasive surface comprises a flat shape at an intermediate section thereof in the radial direction as viewed from the direction perpendicular to the radial direction,
   wherein the abrasive surface comprises a concave shape which is gradually recessed toward a center of the section as the abrasive surface approaches inwardly in the radial direction, and
   wherein the abrasive surface comprises a convex shape which is gradually swelled toward a center of the section as the abrasive surface approaches outwardly in the radial direction.

2. The super finishing stone according to claim 1, wherein the plurality of sections extend in a direction of a circumference of the raceway surface.

3. A super finishing method of super finishing a raceway surface of an object to be worked, in which the raceway surface comprises a flat shape at an intermediate section thereof in the radial direction as viewed at a plurality of sections perpendicular to a radial direction of the object, comes into a convex shape which is gradually swelled toward a center of the section as approaching inwardly in the radial direction, and comes into a concave shape which is gradually recessed toward a center of the section as approaching outwardly in the radially direction, the method comprising:
   disposing a super finishing stone according to claim 1 so that surface profiles of the raceway surface and the abrasive surface match with each other in a convex-concave relation, and
   oscillating the super finishing stone in the radial direction within a predetermined angle range around a center of curvature of the raceway surface.

* * * * *